United States Patent
Valint, Jr. et al.

(10) Patent No.: US 6,193,369 B1
(45) Date of Patent: Feb. 27, 2001

(54) PLASMA SURFACE TREATMENT OF SILICONE HYDROGEL CONTACT LENSES

(75) Inventors: Paul L. Valint, Jr.; George L. Grobe, both of Pittsford; Daniel M. Ammon, Jr., Rochester; Michael J. Moorehead, Fairport, all of NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 09/295,675

(22) Filed: Apr. 21, 1999

Related U.S. Application Data
(60) Provisional application No. 60/084,332, filed on May 5, 1998.

(51) Int. Cl.[7] .................................................. G02C 7/04
(52) U.S. Cl. ................................. 351/160 H; 351/160 R
(58) Field of Search ........................ 351/160 R, 160 H, 351/161, 162, 177

(56) References Cited

U.S. PATENT DOCUMENTS

| | | | |
|---|---|---|---|
| 3,959,105 | 5/1976 | Feneberg et al. | 204/165 |
| 4,055,378 | 10/1977 | Feneberg et al. | 351/160 |
| 4,122,942 | 10/1978 | Wolfson | 206/5.1 |
| 4,143,949 | 3/1979 | Chen | 351/160 |
| 4,214,014 | 7/1980 | Hoffer et al. | 427/40 |
| 4,217,038 | 8/1980 | Letter et al. | 351/160 |
| 4,312,575 | 1/1982 | Peyman et al. | 351/160 |
| 4,632,844 | 12/1986 | Yanagihara et al. | 427/38 |
| 4,980,208 | 12/1990 | Sugiyama et al. | 427/444 |
| 5,080,924 | 1/1992 | Kamel et al. | 427/2 |
| 5,135,297 | * 8/1992 | Valint, Jr. | 351/160 R |
| 5,177,165 | * 1/1993 | Valint, Jr. et al. | 526/245 |
| 5,512,329 | * 4/1996 | Guire et al. | 427/508 |
| 5,708,050 | * 1/1998 | Nakada et al. | 523/107 |

FOREIGN PATENT DOCUMENTS

| | | |
|---|---|---|
| 508477 | 3/1980 | (AU) . |
| 1 362 939 | 8/1974 | (GB) . |
| 08227001 | 9/1996 | (JP) . |
| WO 95/04609 | 2/1995 | (WO) . |

OTHER PUBLICATIONS

Grobe et al. A Silicone Soft Contact Lens Surface Rearrangement et al. Surfaces in Biomaterials Symposium 1996.
Grobe et al. Electrical and Optical Polymer Systems et al. World Scientific Pub. Co. Pte. Ltd London England 1997.

* cited by examiner

Primary Examiner—Scott J. Sugarman
(74) Attorney, Agent, or Firm—Robert B. Furr, Jr.

(57) ABSTRACT

The present invention provides an optically clear, hydrophilic coating upon the surface of a silicone hydrogel lens by subjecting the surface of the lens to a process comprising plasma treatment, hydration, and heat sterilization that is controlled to result in a silicate-containing film having a mosaic pattern of projecting plates surrounded by fissures when viewing a 50×50 micron square AFM image, wherein the peak-to-valley distances of the fissures are on average between about 100 and 500 angstroms and the plate coverage is on average between about 40% to 99%.

9 Claims, 3 Drawing Sheets

PLASMA SURFACE TREATMENT OF SILICONE HYDROGEL CONTACT LENSES

This application claims benefit to U.S. Provisional application Ser. No. 60/084,332, filed May 5, 1998.

FIELD OF THE INVENTION

The present invention is directed to the surface treatment of silicone hydrogel contact lenses. In particular, the present invention is directed to a method of modifying the surface of a contact lens to increase its wettability and to decrease its susceptibility to protein and lipid deposition during use. The surface treatment results in a silicate-containing surface film or coating having a mosaic pattern of raised plates surrounded by receding spaces or fissures. When viewing a 50×50 micron square AFM image of the surface, the peak-to-valley distances of the fissures are on average between about 100 and 500 angstroms and the plate coverage is on average between about 40% to 99%.

BACKGROUND

Contact lenses made from silicone-containing materials have been investigated for a number of years. Such materials can generally be subdivided into two major classes, namely hydrogels and non-hydrogels. Non-hydrogels do not absorb appreciable amounts of water, whereas hydrogels can absorb and retain water in an equilibrium state. Regardless of their water content, both non-hydrogel and hydrogel silicone contact lenses tend to have relatively hydrophobic, non-wettable surfaces.

Those skilled in the art have long recognized the need for modifying the surface of such silicone contact lenses so that they are compatible with the eye. It is known that increased hydrophilicity of the contact lens surface improves the wettability of the contact lenses. This in turn is associated with improved wear comfort of contact lenses. Additionally, the surface of the lens can affect the lens's susceptibility to deposition, particularly the deposition of proteins and lipids from the tear fluid during lens wear. Accumulated deposition can cause eye discomfort or even inflammation. In the case of extended wear lenses, the surface is especially important, since extended wear lens must be designed for high standards of comfort over an extended period of time, without requiring daily removal of the lens before sleep. Thus, the regimen for the use of extended wear lenses would not provide a daily period of time for the eye to recover from any discomfort or other possible adverse effects of lens wear.

Silicone lenses have been subjected to plasma surface treatment to improve their surface properties, e.g., surfaces have been rendered more hydrophilic, deposit resistant, scratch resistant, or otherwise modified. Examples of previously disclosed plasma surface treatments include subjecting contact lens surfaces to a plasma comprising an inert gas or oxygen (see, for example, U.S. Pat. Nos. 4,055,378; 4,122,942; and 4,214,014); various hydrocarbon monomers (see, for example, U.S. Pat. No. 4,143,949); and combinations of oxidizing agents and hydrocarbons such as water and ethanol (see, for example, WO 95/04609 and U.S. Pat. No 4,632,844). U.S. Pat. No. 4,312,575 to Peyman et al. discloses a process for providing a barrier coating on a silicone or polyurethane lens by subjecting the lens to an electrical glow discharge (plasma) process conducted by first subjecting the lens to a hydrocarbon atmosphere followed by subjecting the lens to oxygen during flow discharge, thereby increasing the hydrophilicity of the lens surface.

Although such surface treatments have been disclosed for modifying the surface properties of silicone contact lenses, the results have been problematic and of questionable commercial viability, which has no doubt contributed to the fact that silicone hydrogel contact lens have yet to be commercialized. For example, U.S. Pat. No. 5,080,924 to Kamel et al. states that although exposing the surface of an object to plasma discharge with oxygen is known to enhance the wettability or hydrophilicity of such surface, such treatment is only temporary.

Although the prior art has attempted to show that the surface treatment of contact lenses in the unhydrated state can be accomplished, there has been little or no discussion of the possible effect of subsequent processing or manufacturing steps on the surface treatment of the lens and no teaching or description of the surface properties of a fully processed hydrogel lens manufactured for actual wear. Similarly, there has been little or no published information.

Thus, it is desired to provide a silicone hydrogel contact lens with an optically clear, hydrophilic surface film that will not only exhibit improved wettability, but which will generally allow the use of a silicone hydrogel contact lens in the human eye for extended period of time. In the case of a silicone hydrogel lens for extended wear, it would be highly desirable to provide a contact lens with a surface that is also highly permeable to oxygen and water. Such a surface treated lens would be comfortable to wear in actual use and would allow for the extended wear of the lens without irritation or other adverse effects to the cornea. It would be desirable if such a surface treated lens were a commercially viable product capable of economic manufacture.

SUMMARY OF THE INVENTION

The present invention is directed to a silicone hydrogel lens with a silicate-containing surface film having a mosaic pattern of projecting plates surrounded by receding spaces or fissures when viewing a 50-by-50 micron square AFM (Atomic Force Microscopy) image in which the average peak-to-valley distance (or average depth) of the fissures is between about 100 and 500 angstroms and the plate coverage is on average of about 40% to 99%. The present invention is also directed to a method of modifying the surface of a contact lens to increase its wettability and to increase its resistance to the formation of deposits during wear. The surface film can be made by oxidative plasma treatment of the lens under suitable plasma conditions followed by hydration and autoclaving.

DETAILED DESCRIPTION OF THE INVENTION

Figure 1:
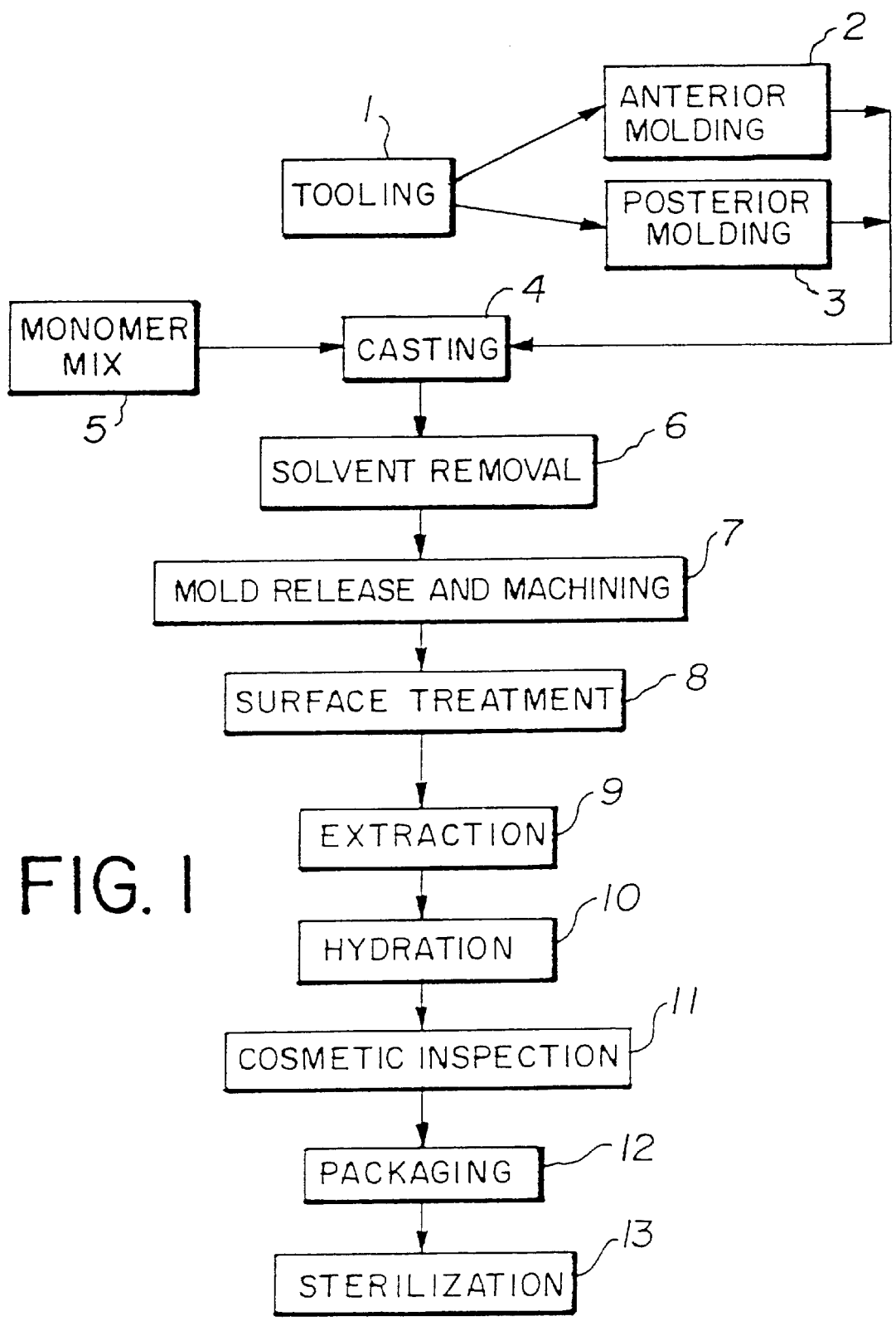
FIG. 1 is a flow chart of a manufacturing process for making a lens having a lens coating according to the present invention.

As mentioned above, the present invention is directed to a silicone hydrogel contact lens having a silicate-containing coating and a method of manufacturing the same, which coating improves the hydrophilicity and lipid/protein resistance of the lens. Thus, the silicate-containing coating allows a lens that could otherwise not be comfortably worn in the eye to be worn in the eye for an extended period of time, for more than 24 hours at a time.

The surface treatment of silicone hydrogel lenses is complicated by the fact that, although silicone hydrogel lenses may be plasma treated in an unhydrated state, such lenses, unlike their non-hydrogel counterparts, are subsequently swollen by solvent extraction and hydration, which can cause the dimensions of the lens to substantially change after coating. In fact, hydration may cause the lens to swell from about 10 to more than about 20 percent or more, depending upon the ultimate water content of the lens. In addition to lens swelling during solvent extraction and hydration, the subsequent autoclaving of the hydrated lens, a common form of sterilizing lenses during the manufacture of packaged lenses, has also been found to substantially affect the plasma modified lens surface. The present invention is directed to a surface-modified silicone hydrogel lens having a silicate-containing coating that exhibits desirable coating characteristics, even after the lens has been extracted, hydrated, and autoclaved.

In particular, a silicone hydrogel contact lens is provided with a silicate-containing coating that displays a mosaic-like pattern of relatively flat plates surrounded and separated by relatively narrow spaces or fissures wherein (i) the plates provide a surface coverage on average of between about 40 percent to 99 percent, and (ii) the fissures have a peak-to-valley distance on average of between 100 and 500 angstroms. These coating characteristics of a fully processed lens, following surface treatment, hydration, and sterilization, can be observed and determined when viewing a 50×50 square micron image under Atomic Force Microscopy (AFM) as described in detail below.

The invention is applicable to a wide variety of silicone hydrogel contact lens materials. Hydrogels in general are a well known class of materials which comprise hydrated, cross-linked polymeric systems containing water in an equilibrium state. Silicone hydrogels generally have a water content greater than about 5 weight percent and more commonly between about 10 to about 80 weight percent. Such materials are usually prepared by polymerizing a mixture containing at least one silicone-containing monomer and at least one hydrophilic monomer. Typically, either the silicone-containing monomer or the hydrophilic monomer functions as a crosslinking agent (a crosslinker being defined as a monomer having multiple polymerizable functionalities) or a separate crosslinker may be employed. Applicable silicone-containing monomeric units for use in the formation of silicone hydrogels are well known in the art and numerous examples are provided in U.S. Pat. Nos. 4,136,250; 4,153,641; 4,740,533; 5,034,461; 5,070,215; 5,260,000; 5,310,779; and 5,358,995.

Examples of applicable silicon-containing monomeric units include bulky polysiloxanylalkyl (meth)acrylic monomers. An example of bulky polysiloxanylalkyl (meth)acrylic monomers are represented by the following Formula I:

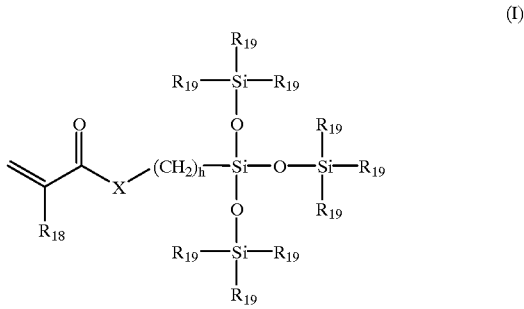

(I)

wherein:
X denotes —O— or —NR—;
each $R_{18}$ independently denotes hydrogen or methyl;
each $R_{19}$ independently denotes a lower alkyl radical, phenyl radical or a group represented by

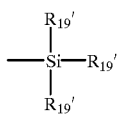

wherein each $R_{19}$, independently denotes a lower alkyl or phenyl radical; and
h is 1 to 10.

Some preferred bulky monomers are methacryloxypropyl tris(trimethyl-siloxy)silane or tris(trimethylsiloxy) silylpropyl methacrylate, sometimes referred to as TRIS, and tris(trimethylsiloxy)silylpropyl vinyl carbamate, sometimes referred to as TRIS-VC.

Another class of representative silicon-containing monomers includes silicone-containing vinyl carbonate or vinyl carbonate monomers such as: 1,3-bis[4-vinyloxycarbonyloxy)but-1 -yl]tetramethyl-disiloxane; 3-(trimethylsilyl)propyl vinyl carbonate; 3-(vinyloxycarbonylthio)propyl-[tris(trimethylsiloxy) silane]; 3-[tris(tri-methylsiloxy)silyl] propyl vinyl carbamate; 3-[tris(trimethylsiloxy)silyl] propyl allyl carbamate; 3-[tris(trimethylsiloxy)silyl]propyl vinyl carbonate; t-butyldimethylsiloxyethyl vinyl carbonate; trimethylsilylethyl vinyl carbonate; and trimethylsilylmethyl vinyl carbonate.

An example of silicon-containing vinyl carbonate or vinyl carbamate monomers are represented by Formula II:

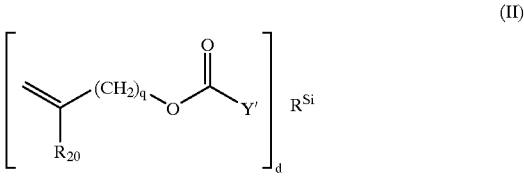

(II)

wherein:
Y' denotes —O—, —S— or —NH—;
$R^{Si}$ denotes a silicone-containing organic radical;
$R_{20}$ denotes hydrogen or methyl;
d is 1, 2, 3 or 4; and q is 0 or 1.
Suitable silicone-containing organic radicals $R^{Si}$ include the following:

$-(CH_2)_n\text{-Si}[(CH_2)_m\text{-}CH_3]_3;$ $-(CH_2)_n\text{-Si}[OSi(CH_2)_m\text{-}CH_3]_3;$

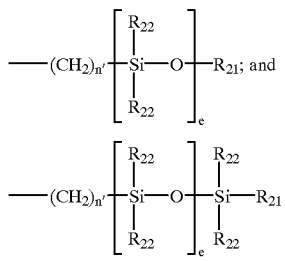

wherein:

$R_{21}$ denotes

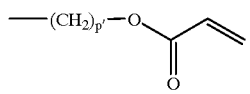

wherein p' is 1 to 6;
$R_{22}$ denotes an alkyl radical or a fluoroalkyl radical having 1 to 6 carbon atoms;
e is 1 to 200; n' is 1, 2, 3 or 4; and m' is 0, 1, 2, 3, 4 or 5.

An example of a particular species within Formula II is represented by Formula III.

(III)

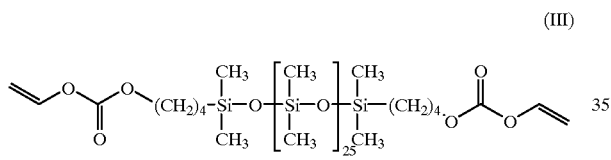

Another class of silicon-containing monomers includes polyurethane-polysiloxane macromonomers (also sometimes referred to as prepolymers), which may have hard-soft-hard blocks like traditional urethane elastomers. They may be end-capped with a hydrophilic monomer such as HEMA. Examples of such silicone urethanes are disclosed in a variety or publications, including Lai, Yu-Chin, "The Role of Bulky Polysiloxanylalkyl Methacryates in Polyurethane-Polysiloxane Hydrogels," *Journal of Applied Polymer Science*, Vol. 60, 1193–1199 (1996). PCT Published Application No. WO 96/31792 discloses examples of such monomers, which disclosure is hereby incorporated by reference in its entirety. Further examples of silicone urethane monomers are represented by Formulae IV and V:

(IV) $E(*D*A*D*G)_a*D*A*D*E';$ or (V) $E(*D*G*D*A)_a*D*G*D*E';$ wherein:

D denotes an alkyl diradical, an alkyl cycloalkyl diradical, a cycloalkyl diradical, an aryl diradical or an alkylaryl diradical having 6 to 30 carbon atoms;

G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

a is at least 1;

A denotes a divalent polymeric radical of Formula VI:

(VI)

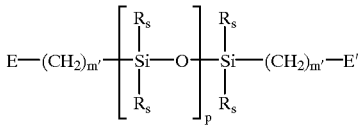

wherein:

each $R_s$ independently denotes an alkyl or fluoro-substituted alkyl group having 1 to 10 carbon atoms which may contain ether linkages between carbon atoms;

m' is at least 1; and p is a number which provides a moiety weight of 400 to 10,000;

each of E and E' independently denotes a polymerizable unsaturated organic radical represented by Formula VII:

(VII)

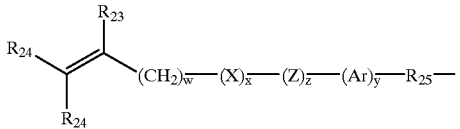

wherein:

$R_{23}$ is hydrogen or methyl;

$R_{24}$ is hydrogen, an alkyl radical having 1 to 6 carbon atoms, or a $-CO-Y-R_{26}$ radical wherein Y is $-O-$, $-S-$ or $-NH-$;

$R_{25}$ is a divalent alkylene radical having 1 to 10 carbon atoms;

$R_{26}$ is a alkyl radical having 1 to 12 carbon atoms;

X denotes $-CO-$ or $-OCO-$;

Z denotes $-O-$ or $-NH-$;

Ar denotes an aromatic radical having 6 to 30 carbon atoms;

w is 0 to 6; x is 0 or 1; y is 0 or 1; and z is 0 or 1.

A more specific example of a silicone-containing urethane monomer is represented by Formula (VIII):

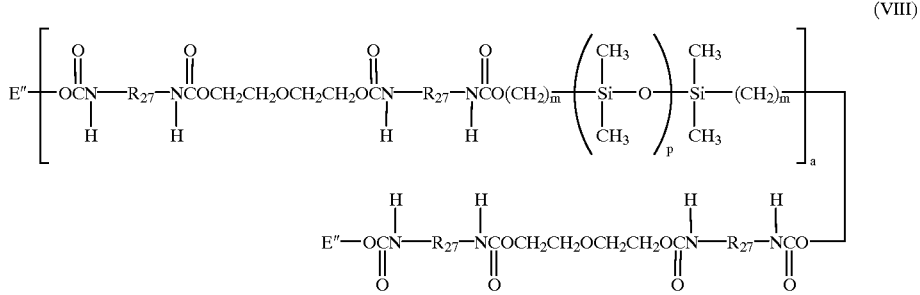

(VIII)

wherein m is at least 1 and is preferably 3 or 4, a is at least 1 and preferably is 1, p is a number which provides a moiety weight of 400 to 10,000 and is preferably at least 30, $R_{27}$ is a diradical of a diisocyanate after removal of the isocyanate group, such as the diradical of isophorone diisocyanate, and each E" is a group represented by:

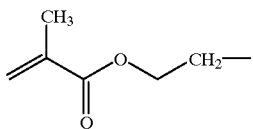

A preferred silicone hydrogel material comprises (in the bulk monomer mixture that is copolymerized) 5 to 50 percent, preferably 10 to 25, by weight of one or more silicone macromonomers, 5 to 75 percent, preferably 30 to 60 percent, by weight of one or more polysiloxanylalkyl (meth)acrylic monomers, and 10 to 50 percent, preferably 20 to 40 percent, by weight of a hydrophilic monomer. In general, the silicone macromonomer is a poly(organosiloxane) capped with an unsaturated group at two or more ends of the molecule. In addition to the end groups in the above structural formulas, U.S. Pat. No. 4,153,641 to Deichert et al. discloses additional unsaturated groups, including acryloxy or methacryloxy. Preferably, the silane macromonomer is a silicon-containing vinyl carbonate or vinyl carbamate or a polyurethane-polysiloxane having one or more hard-soft-hard blocks and end-capped with a hydrophilic monomer.

Suitable hydrophilic monomers for use in silicone hydrogels include, for example, unsaturated carboxylic acids, such as methacrylic and acrylic acids; acrylic substituted alcohols, such as 2-hydroxyethylmethacrylate and 2-hydroxyethylacrylate; vinyl lactams, such as N-vinyl pyrrolidone; and acrylamides, such as methacrylamide and N,N-dimethylacrylamide. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art.

Preferably, the lens material used in the present invention is non-fluorinated or has relatively little fluorine atoms. Although the fluorination of certain monomers used in the formation of silicone hydrogels has been indicated to reduce the accumulation of deposits on contact lenses made therefrom, highly fluorinated materials, because of their particular chemical nature, cannot be used to produce the silicate-containing coatings according to the present invention. The present invention is also not applicable to fumarate siloxane hydrogel compositions according to U.S. Pat. No. 5,420,324. Without wishing to be bound by theory, it is surmised that the surface silicon content of fumaride siloxane lenses is too high for the formation of a sufficiently flexible silicate material, so that the silicate surface formed by oxidative plasma treatment is too glass-like, delaminating during subsequent processing. The silicon content of the surface layer being treated may be either a result of the bulk chemistry of the composition, including its hydrophobic and hydrophilic portions, and/or a result of a surface layering phenomenon resulting in a relative enrichment of layers with respect to different monomers or elements.

Without wishing to be bound by theory, it is believed that the desired coating, in a fully processed coating according to the present invention, has sufficient silicate content to provide the desired surface properties, such as wettability and deposition resistance, and sufficient polymer content to allow sufficient flexibility during swelling and sufficient interfacial cohesion during heat sterilization to prevent delamination. The relative balance, in the coating, of hydrophobic and hydrophilic portions may also affect the coating's resistance to delamination during thermal and hydrodynamic expansion or stress. In general, the hydrodynamic expansion of hydrogels in water is a function of the type and amount of the hydrophilic polymer content; and the thermal expansion is a function of the silicone polymer content. If the first increases, the second may decrease, or vice versa.

Thus, the chemistry of the silicate-containing coating or film in the final product is not completely made of silicate and some of the original material may remain in modified form. However, in general the coating formed by plasma treatment, the original polymeric character of the material is changed to a more glass-like, hard material.

To determine the applicability of the present invention to a particular silicone hydrogel material, the lens can be treated under two widely diverse plasma set of conditions, a first "low and slow" plasma treatment and a second "hot and fast" plasma treatment. If following the steps of plasma treatment, hydration, and heat sterilization (so-called "full processing"), a silicate coating can be obtained, then some further adjustment of the process conditions should be able to achieve a lens coating having surface characteristics according to the present invention. In general, a "low and slow" surface treatment tends to be relatively more effective for a relatively higher silicon-containing lens; a "hot and fast" surface treatment is relatively more effective for a relatively lower silicon-containing lens. By "low and slow" surface treatment is meant relatively lower time, higher pressure, and lower wattage, conditions designed to relatively minimize disruption of covalent bonds while modifying the substrate, thereby leaving more polymer at the coating interface with the lens material. Exemplary "low and slow" conditions for plasma treatment (in a plasma chamber such as used in the following examples) are 100 watts at 0.3 to 0.6 torr, 1–2 minutes per side, with 100 to 300 sccm (standard cubic centimeters per minute) in an air/water/peroxide atmosphere (air bubbled through 8% hydrogen peroxide solution in HPLC grade water). By "hot and fast" treatment is meant relatively higher wattage, lower pressure, and longer time, conditions designed to relatively maximize surface modification. Exemplary "hot and fast" conditions for plasma treatment are 400 watts at 0.1 to 0.4 torr, 10 minutes per side, with 200 to 500 sccm in the above-indicated atmosphere. The existence of a silicate-containing coating can be evidenced by a recognizable or statistically significant change in the surface roughness (RMS), a visual change in the surface morphology as evidenced by AFM, such as the formation of surface plates, or by a statistically significant difference in the XPS data for a lens before treatment compared to a lens fully processed, notably by a difference in the oxygen and/or silicon content (including the appearance of a silicate peak.) A preferred test for the formation of a coating is 1 to 5% change in oxygen content, within a 95% confidence level. As indicated above, if any silicate coating in the fully processed lens (following hydration and heat sterilization) can be formed by either "low and slow" treatment conditions or "hot and fast" treatment conditions, then it is generally possible to obtain a coating according to the present invention by subsequent process adjustments, without undue experimentation, as will be understood by the person skilled in the art. It is noted that the formation of a silicate coating merely following plasma treatment is not the test for the applicability, since subsequent delamination during heat sterilization may occur such that no coating would be apparent in the fully processed lens.

Manufacture of the lens. Contact lenses according to the present invention can be manufactured, employing various conventional techniques, to yield a shaped article having the desired posterior and anterior lens surfaces. Spincasting methods are disclosed in U.S. Pat. Nos. 3,408,429 and 3,660,545; preferred static casting methods are disclosed in U.S. Pat. Nos. 4,113,224 and 4,197,266. Curing of the monomeric mixture is often followed by a machining operation in order to provide a contact lens having a desired final configuration. As an example, U.S. Pat. No. 4,555,732 discloses a process in which an excess of a monomeric mixture is cured by spincasting in a mold to form a shaped article having an anterior lens surface and a relatively large thickness. The posterior surface of the cured spincast article is subsequently lathe cut to provide a contact lens having the desired thickness and posterior lens surface. Further machining operations may follow the lathe cutting of the lens surface, for example, edge finishing operations.

FIG. 1 illustrates a series of manufacturing process steps for static casting of lenses, wherein the first step is tooling (1) whereby, based on a given lens design, metal tools are fabricated by traditional machining and polishing operations. These metal tools are then used in injection or compression molding to produce a plurality of thermoplastic molds which in turn are used to cast the desired lenses from polymerizable compositions. Thus, a set of metal tools can yield a large number of thermoplastic molds. The thermoplastic molds may be disposed after forming a single lens. The metal molds fabricated during tooling (1) is then used for anterior molding (2) and posterior molding (3) in order to produce, respectively, an anterior mold section for forming the desired anterior lens surface and a posterior mold section for forming the desired posterior lens surface. Subsequently, during the operation of casting (4), a monomer mixture (5) is injected into the anterior mold section, and the posterior mold section is pressed down and clamped at a given pressure to form the desired lens shape. The clamped molds may be cured by exposure to UV light or other energy source for a certain period of time, preferably by conveying the molds through a curing chamber, after which the clamps are removed.

After producing a lens having the desired final shape, it is desirable to remove residual solvent from the lens before edge finishing operations. This is because, typically, an organic diluent is included in the initial monomeric mixture in order to minimize phase separation of polymerized products produced by polymerization of the monomeric mixture and to lower the glass transition temperature of the reacting polymeric mixture, which allows for a more efficient curing process and ultimately results in a more uniformly polymerized product. Sufficient uniformity of the initial monomeric mixture and the polymerized product are of particular concern for silicone hydrogels, primarily due to the inclusion of silicone-containing monomers which may tend to separate from the hydrophilic comonomer. Suitable organic diluents include, for example, monohydric alcohols, with $C_6$–$C_{10}$ straight-chained aliphatic monohydric alcohols such as n-hexanol and n-nonanol being especially preferred; diols such as ethylene glycol; polyols such as glycerin; ethers such as diethylene glycol monoethyl ether; ketones such as methyl ethyl ketone; esters such as methyl enanthate; and hydrocarbons such as toluene. Preferably, the organic diluent is sufficiently volatile to facilitate its removal from a cured article by evaporation at or near ambient pressure. Generally, the diluent is included at 5 to 60% by weight of the monomeric mixture, with 10 to 50% by weight being especially preferred.

The cured lens is then subjected to solvent removal (6), which can be accomplished by evaporation at or near ambient pressure or under vacuum. An elevated temperature can be employed to shorten the time necessary to evaporate the diluent. The time, temperature and pressure conditions for the solvent removal step will vary depending on such factors as the volatility of the diluent and the specific monomeric components, as can be readily determined by one skilled in the art. According to a preferred embodiment, the temperature employed in the removal step is preferably at least 50° C., for example, 60 to 80° C. A series of heating cycles in a linear oven under inert gas or vacuum may be used to optimize the efficiency of the solvent removal. The cured article after the diluent removal step should contain no more than 20% by weight of diluent, preferably no more than 5% by weight or less.

Following removal of the organic diluent, the lens is next subjected to mold release and optional machining operations (7) according to the embodiment of FIG. 1. The machining step includes, for example, buffing or polishing a lens edge and/or surface. Generally, such machining processes may be performed before or after the article is released from a mold part. Preferably, the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be turned over in order to machine the other side of the lens.

Subsequent to the mold release/machining operations (7), the lens is subjected to surface treatment (8), preferably by means of oxidative RF plasma treatment of the lens surface employing an oxygen-containing gas. Plasma treatment involves passing an electrical discharge through a gas at low pressure. The electrical discharge is usually at radio frequency (typically, 13.56 MHz), although microwave and other frequencies can be used. This electrical discharge is absorbed by atoms and molecules in their gas state, thus forming a plasma which interacts with the surface of the contact lens.

In the prior art, an oxidizing plasma, e.g., employing $O_2$ (oxygen gas), water, hydrogen peroxide, air, etc., or mixtures thereof, has been used to etch the surface of the lens, creating radicals and oxidized functional groups. Such oxidation is known to render the surface of a silicone lens more hydrophilic; however, the bulk properties of the silicone materials may remain apparent at the surface of the lens or may become apparent after a relatively short period of use. For example, when the oxidation is relatively superficial, the silicone chains adjacent the lens surface are capable of migrating and/or rotating, thus exposing hydrophobic groups to the outer surface even on a fully extracted polymer. Also, an oxidized surface may lose the coating due to delamination during further processing steps, including autoclaving. In contrast, the plasma conditions of the present invention are adjusted and set to obtain the desired combination of ablation and oxidation of the surface material, based on careful quality control of the resulting coating. A relatively thick coating, a permanent barrier between the underlying silicone materials and the outer lens surface, is thereby achieved in the final product.

A plasma for the surface modification of the lens is initiated by a low energy discharge. Collisions between energetic free electrons present in the plasma cause the formation of ions, excited molecules, and free radicals. Such species, once formed, can react with themselves in the gas phase as well as with further ground-state molecules. The plasma treatment may be understood as an energy dependent process involving energetic gas molecules. For chemical reactions to take place at the surface of the lens, one needs the required species (element or molecule) in terms of charge state and particle energy. Radio frequency plasmas generally produce a distribution of energetic species. Typically, the "particle energy" refers to the average of the so-called Boltzman-style distribution of energy for the energetic species. In a low density plasma, the electron energy distribution can be related by the ratio of the electric field strength sustaining the plasma to the discharge pressure (E/p). The plasma power density P is a function of the wattage, pressure, flow rates of gases, etc., as will be appreciated by the skilled artisan. Background information on plasma technology, hereby incorporated by reference, include the following: A. T. Bell, Proc. Intl. Conf. Phenom. Ioniz. Gases, *"Chemical Reaction in Nonequilibrium Plasmas"*, 19–33 (1977); J. M. Tibbitt, R. Jensen, A. T. Bell, M. Shen, Macromolecules, *"A Model for the Kinetics of Plasma Polymerization"*, 3, 648–653 (1977); J. M. Tibbitt, M. Shen, A. T. Bell, J. Macromol. Sci.-Chem., *"Structural Characterization of Plasma-Polymerized Hydrocarbons"*, A10, 1623–1648 (1976); C. P. Ho, H. Yasuda, J. Biomed, Mater. Res., *"Ultrathin coating of plasma polymer of methane applied on the surface of silicone contact lenses"*, 22, 919–937 (1988); H. Kobayashi, A. T. Bell, M. Shen, Macromolecules, *"Plasma Polymerization of Saturated and Unsaturated Hydrocarbons"*, 3, 277–283 (1974); R. Y. Chen, U.S. Pat. No., 4,143,949, Mar. 13, 1979, *"Process for Putting a Hydrophilic Coating on a Hydrophobic Contact lens"*; and H. Yasuda, H. C. Marsh, M. O. Bumgarner, N. Morosoff, J. of Appl. Poly. Sci., *"Polymerization of Organic Compounds in an Electroless Glow Discharge. VI Acetylene with Unusual Comonomers"*, 19, 2845–2858 (1975).

Based on this previous work in the field of plasma technology, the effects of changing pressure and discharge power on the rate of plasma modification can be understood. The rate generally decreases as the pressure is increased. Thus, as pressure increases the value of E/p, the ratio of the electric field strength sustaining the plasma to the gas pressure, decreases and causes a decrease in the average electron energy. The decrease in electron energy in turn causes a reduction in the rate coefficient of all electron-molecule collision processes. A further consequence of an increase in pressure is a decrease in electron density. Providing that the pressure is held constant, there should be a linear relationship between electron density and power.

In practice, contact lenses are surface treated by placing them, in their unhydrated state, within an electric glow discharge reaction vessel (e.g., a vacuum chamber). Such reaction vessels are commercial available. The lenses may be supported within the vessel on an aluminum tray (which acts as an electrode) or with other support devices designed to adjust the position of the lenses. The use of a specialized support devices which permit the surface treatment of both sides of a lens are known in the art and may be used in the present invention.

The gas employed in the plasma treatment comprises an oxidizing media such as, for example, air, water, peroxide, $O_2$ (oxygen gas), or combinations thereof, at a electric discharge frequency of, for example, 13.56 MHz, suitably between about 100–1000 watts, preferably 200 to 800 watts, more preferably 300 to 500 watts, at a pressure of about 0.1–1.0 Torr. The plasma treatment time is greater than 4 minutes per side, preferably at least about 5 minutes per side, more preferably about 6 to 60 minutes per side, most preferably about 8 to 30 minutes per side for effective but efficient manufacture. It is preferred that a relatively "strong" oxidizing plasma is utilized in this initial oxidation, e.g. ambient air drawn through a 3 to 30% by weight, preferably 4 to 15%, more preferably 5 to 10% hydrogen peroxide solution, preferably at a flow rate of 50 to 500 sccm, more preferably 100 to 300 sccm.

Such plasma treatment directly results in a relatively thick smooth film which may approach the point where the optical clarity is affected, that is, about 1500 angstroms. Preferably, the postplasma coating thickness should be greater than 1000 angstroms, since substantial thickness will be lost during subsequent processing. Following hydration and autoclaving, as further discussed below, the surface becomes fissured and the thickness may be reduced more than 50 percent, even as much as 90 percent or more, from the initial coating thickness.

In order to obtain the desired coating, the process parameters may need to be adjusted in order to obtain a combination of ablation and glass formation that results in the desired coating as subjected after being subjected to further processing steps. The thickness of the coating is sensitive to plasma flow rate and chamber temperature. Higher flow rates tend to cause more ablation; lower pressures tend to produce thicker coatings out of the plasma chamber. However, higher temperatures may tend to result in a surface that is less glassy and less cohesive.

Since the coating is dependent on a number of variables, the optimal variables for obtaining the desired or optimal coating may require some adjustment. If one parameter is adjusted, a compensatory adjustment of one or more other parameters may be appropriate, so that some routine trial and error experiments and iterations thereof may be necessary in order to achieved the coating according to the present invention. However, such adjustment of process parameters, in light of the present disclosure and the state of the art in plasma treatment, should not involve undue experimentation. As indicated above, general relationships among process parameters are known by the skilled artisan, and the art of plasma treatment has become well developed in recent years. The Examples below provide the Applicants' best mode for forming the coating on a silicone hydrogel lens.

Subsequent to the step of surface treatment (8) in the embodiment of FIG. 1, the lens may be subjected to extraction (9) to remove residuals in the lenses. Generally, in the manufacture of contact lenses, some of the monomer mix is not fully polymerized. The incompletely polymerized material from the polymerization process may affect optical clarity or may be harmful to the eye. Residual material may include solvents not entirely removed by the previous solvent removal operation, unreacted monomers from the monomeric mixture, oligomers present as by-products from the polymerization process, or even additives that may have migrated from the mold used to form the lens.

Conventional methods to extract such residual materials from the polymerized contact lens material include extraction with an alcohol solution for several hours (for extraction of hydrophobic residual material) followed by extraction with water (for extraction of hydrophilic residual material). Thus, some of the alcohol extraction solution remains in the polymeric network of the polymerized contact lens material, and should be extracted from the lens material before the lens may be worn safely and comfortably on the eye. Extraction of the alcohol from the lens can be achieved employing heated water for several hours. Extraction should be as complete as possible, since incomplete extraction of residual material from lenses may contribute adversely to the useful life of the lens. Also, such residuals may impact lens performance and comfort by interfering with optical clarity or the desired uniform hydrophilicity of the lens surface. It is important that the selected the extraction solution in no way adversely affects the optical clarity of the lens. Optical clarity is subjectively understood to be the level of clarity observed when the lens is visually inspected.

Subsequent to extraction (9), the lens is subjected to hydration (10) in which the lens is fully hydrated with water, buffered saline, or the like. When the lens is ultimately fully hydrated (wherein the lens typically may expand by 10 to about 20 percent or more), the coating remains intact and bound to the lens, providing a durable, hydrophilic coating which has been found to be resistant to delamination.

Following hydration (10), the lens may undergo cosmetic inspection (11) wherein trained inspectors inspect the contact lenses for clarity and the absence of defects such as holes, particles, bubbles, nicks, tears. Inspection is preferably at 10× magnification. After the lens has passed the steps of cosmetic inspection (11), the lens is ready for packaging (12), whether in a vial, plastic blister package, or other container for maintaining the lens in a sterile condition for the consumer. Finally, the packaged lens is subjected to sterilization (13), which sterilization may be accomplished in a conventional autoclave, preferably under an air pressurization sterilization cycle, sometimes referred to as an air-steam mixture cycle, as will be appreciated by the skilled artisan. Preferably the autoclaving is at 100° C. to 200° C. for a period of 10 to 120 minutes. Following sterilization, the lens dimension of the sterilized lenses may be checked prior to storage.

Following the hydration and sterilization steps, the silicate-containing coating produced by plasma treatment has been modified to its final form, in which the coating displays a mosaic pattern of projecting plates surrounded by receding fissures, akin in appearance to closely spaced islands surrounding by rivers. When viewing a 50×50 square micron image by Atomic Force Microscopy, the peak-to-valley distances (or depth) of the fissures is on average between about 100 and 500 angstroms, and the plate coverage (or surface coverage) is on average between about 40% and 99%. The depth of the fissures can be considered to be a measurement of the "coating thickness," wherein the fissures expose the underlying hydrogel material under the silicate-containing, glass-like coating. Preferably, the peak-to-valley distances of the fissures is on average between 150 and 200 angstroms and preferably the plate coverage is on average about 50% to 99 percent, more preferably 60 to 99%.

By the term "on average" is meant a statistic average of measurements of controlled lots of lenses taken during commercial manufacture, based on average measurements of each lens in the optical zone. Preferably, the average for each lens is calculated based on the evaluation of three 50×50 square micron images per side of the each lens, as in the examples below. By the term "controlled manufacture" or "controlled process" is meant that the manufactured product is consistently produced and subject to quality control so that the average values are within a preselected range, or within a preselected range of specifications, with respect to fissure depth and plate coverage. In terms of consistency, preferably at least 70%, more preferably at least 80%, most preferably at least 90% of the manufactured lenses, with a 95% confidence level, should meet the claimed ranges for coating thickness and plate coverage. Preferably, the average value, for surface coverage and coating thickness, of the manufactured lenses should be within the claimed ranges within a 90% confidence level, more preferably within a 95% confidence level.

EXAMPLE 1

This example discloses a representative silicone hydrogel lens material used in the following Examples. The formulation for the material is provided in Table 1 below.

TABLE 1

| Component | Parts by Weight |
| --- | --- |
| TRIS-VC | 55 |
| NVP | 30 |
| $V_2D_{25}$ | 15 |
| VINAL | 1 |
| n-nonanol | 15 |
| Darocur | 0.2 |
| tint agent | 0.05 |

The following materials are designated above:

| | |
| --- | --- |
| TRIS-VC | tris(trimethylsiloxy)silyipropyl vinyl carbamate |
| NVP | N-vinyl pyrrolidone |
| $V_2D_{25}$ | a silicone-containing vinyl carbonate as previously described in U.S. Pat. No. 5,534,604. |
| VINAL | N-vinyloxycarbonyl alanine |
| Darocur | Darocur-1173, a UV initiator |
| tint agent | 1,4-bis[4-(2-methacryloxyethyl) phenylamino] anthraquinone |

EXAMPLE 2

This Example illustrates a process for the surface modification of a contact lens according to the present invention. Silicone hydrogel lenses made of the formulation of Example 1 above were cast molded from polypropylene molds. Under an inert nitrogen atmosphere, 45– μof the formulation was injected onto a clean polypropylene concave mold half and covered with the complementary polypropylene convex mold half. The mold halves were compressed at a pressure of 70 psi and the mixture was cured for about 15 minutes in the presence of UV light (6–11 mW/cm$^2$ as measured by a Spectronic UV meter). The mold was exposed to UV light for about 5 additional minutes.

The top mold half was removed and the lenses were maintained at 60° C. for 3 hours in a forced air oven to remove n-hexanol. Subsequently, the lens edges were ball buffed for 10 seconds at 2300 rpm with a force of 60 g. The lenses were then plasma treated as follows: The lenses were placed concave side up on an aluminum coated tray and the tray placed into a plasma treatment chamber. The atmosphere was produced by passing air at 400 sccm into the chamber through an 8% peroxide solution, resulting in an Air/$H_2O$/$H_{22}O_2$ gas mixture. The lenses were plasma treated for a period of 8 minutes (350 watts, 0.5 Torr). The chamber was then backfilled to ambient pressure. The tray was then removed from the chamber, the lenses flipped over, and the procedure repeated to plasma treat the other side of the lenses.

Lenses were analyzed directly from the plasma chamber and after full processing. Full processing included, following plasma treatment, extraction, hydration and autoclave sterilization. Extraction employed isopropanol at room temperature for 4 hours (during commercial manufacture a minimum of 48 hours following by extraction in water at about 85° C. for 4 hours is preferred). The lenses were then immersed in buffered saline for hydration. Autoclaving was carried out with the lenses, within vials, immersed in an aqueous packaging solution.

The plasma chamber was a direct current DC RFGD chamber manufactured by Branson GaSonics Division (Model 7104). This chamber was a cold equilibrium planar configuration which had a maximum power of 500 watts. All lenses were prepumped to 0.01 Torr prior to any plasma treatment from residual air in the chamber. This process reduced the relative treatment level of the polymer by controlling gas pressure.

All lenses in this study were analyzed as received. The pre-plasma and post plasma lenses were analyzed dry. The fully processed lenses were removed from the vials and desalinated in HPLC grade water in a static fashion for a minimum of 15 minutes. Three lens posteriors and three lens anteriors from the pre-plasma, post plasma, and fully process lenses of each lot were analyzed by X-ray Photoelectron Spectroscopic (XPS).

The XPS data was acquired by a Physical Electronics [PHI] Model 5600 Spectrometer. To collect the data, the instrument's aluminum anode was operated at 300 watts, 15 kV, and 20 mA. The Al Kα line was the excitation source monochromatized by a toroidal lens system. A 7 mm filament was utilized by the X-ray monochromator to focus the X-ray source which increases the need for charge dissipation through the use of a neutralizer. The base pressure of the instrument was 2.0×10–10 Torr while during operation it was 1.0×10–9 Torr. A hemispherical energy analyzer measures electron kinetic energy. The practical sampling depth of the instrument, with respect to carbon, at a sampling angle of 45°, is approximately 74 Angstroms. All elements were charge corrected to the $CH_x$ peak of carbon binding energy of 285.0 eV.

Each of the plasma modified specimens were analyzed by XPS utilizing a low resolution survey spectra [0–1100 eV] to identify the elements present on the sample surface. The high resolution spectra were performed on those elements detected from the low resolution scans. The elemental composition was determined from the high resolution spectra. The atomic composition was calculated from the areas under the photoelectron peaks after sensitizing those areas with the instrumental transmission function and atomic cross sections for the orbital of interest. Since XPS does not detect the presence of hydrogen or helium, these elements will not be included in any calculation of atomic percentages. The atomic composition data has been outlined in

TABLE 2

| | | Oxygen | Nitrogen | Carbon | Silicon | Fluorine |
|---|---|---|---|---|---|---|
| Experiment 1 | | | | | | |
| pre-plasma | AVG | 18.6 | 6.2 | 64.7 | 10.5 | 0.0 |
| | STDEV | 1.2 | 0.4 | 1.3 | 0.7 | 0.0 |
| post-plasma | AVD | 47.6 | 3.1 | 29.0 | 18.9 | 1.6 |
| | STDEV | 1.3 | 0.2 | 1.3 | 0.3 | 0.1 |
| fully | AVG | 19.5 | 7.8 | 64.8 | 7.9 | 0.0 |
| processed | STDEV | 0.8 | 0.3 | 0.9 | 0.3 | 0.0 |
| Experiment 2 | | | | | | |
| pre-plasma | AVG | 18.0 | 6.0 | 65.2 | 10.8 | 0.0 |
| | STDEV | 0.5 | 0.5 | 0.9 | 0.7 | 0.0 |
| post plasma | AVG | 49.4 | 2.7 | 26.5 | 20.1 | 1.4 |
| | STDEV | 1.5 | 0.3 | 2.0 | 0.9 | 0.2 |
| fully | AVG | 19.6 | 7.7 | 64.8 | 7.8 | 0.0 |
| processed | STDEV | 0.3 | 0.3 | 0.8 | 0.7 | 0.0 |
| Experiment 3 | | | | | | |
| pre-plasma | AVG | 18.1 | 6.0 | 66.8 | 9.1 | 0.0 |
| | STDEV | 1.2 | 0.7 | 1.5 | 0.8 | 0.0 |
| post plasma | AVG | 50.2 | 1.7 | 22.0 | 23.1 | 2.6 |
| | STDEV | 1.3 | 0.3 | 1.9 | 1.0 | 0.5 |

Each experiment involved testing 6 lens from the sample lot of 50 to 100 lenses. The survey spectra for the pre-plasma lenses of Experiments 1 to 3 contain photoelectron peaks indicative of oxygen, nitrogen, carbon, and silicon. The silicon $2p_{3/2}$ peak position (102.4 eV) indicates that the detected silicon on the surface originated from derivatives of silicone. The survey spectra for the post-plasma lenses of the Experiments 1 to 3 contain photo-electron peaks indicative of oxygen, nitrogen, carbon, silicon, and fluorine. The fluorine is a by-product of the plasma ablation of the Teflon runners which support the trays used to hold the lenses. The silicon $2p_{3/2}$ photoelectron peak position (103.7 eV) indicates that the detected silicon on the surface originated from silicates, verifying the presence of a coating. As evidenced, slight differences in the elemental analyses for different experiments may result from slight variations in the plasma processing parameters, location in the chamber, or as a result of inherent surface properties of the lenses of this particular lot.

In addition, Atomic Force Microscopy (AFM) was employed to study the morphology of the contact lens surfaces. AFM works by measuring nano-scale forces ($10^{-9}$ N) between a sharp probe and atoms on the lens surface. The probe is mounted on a cantilever substrate. The deflection of the cantilever, measured by a laser detection system, is processed to generate height information. While gathering height information, the probe is rastered in the x–y plane to generate a three dimensional topographical image of the lens surface. In the optical zone of each lens, three images were sampled on both sides of the lens.

The fraction of the lens surface that is covered by the coating is referred to as "plate coverage" or "surface coverage." This measurement is sometimes easily made by looking at a histogram of the surface heights. However, when the coating is too thin, (<10 nm) the coverage is not attainable from the histogram. When this occurs, the AFM image in question is compared to previous AFM images of which the exact coverage is known. When this visual method is used, the coverage is estimated and correct to within ±10%.

Figure 2:
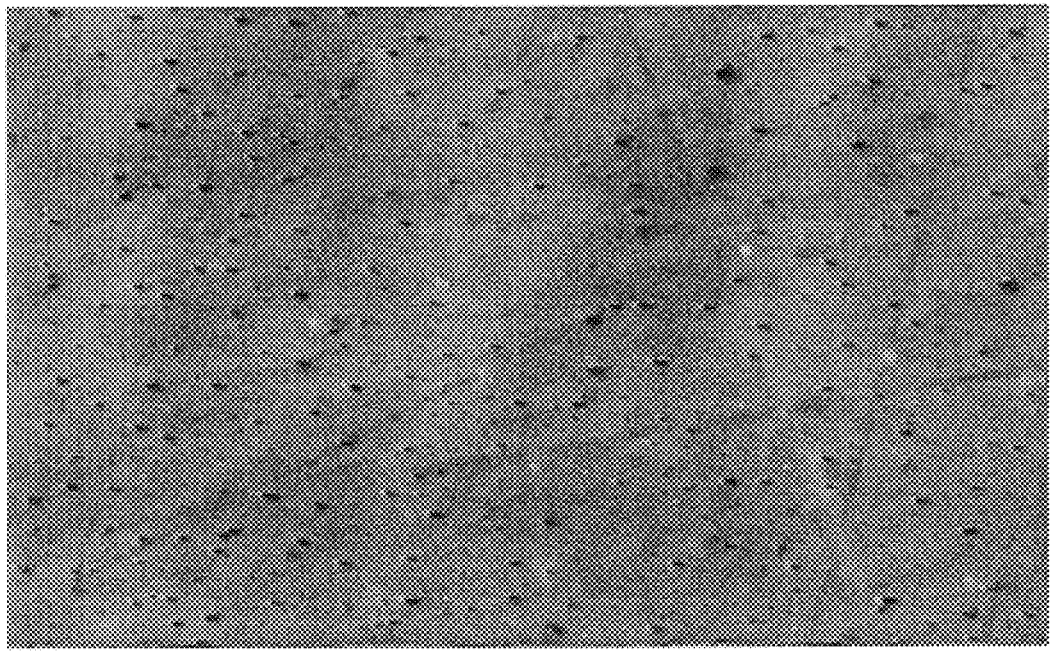
FIG. 2 is an Atomic Force Microscopy (AFM) topographical image (50×50 microns) showing a plasma-treated lens before further processing by extraction, hydration and sterilization according to the present invention.

FIG. 2 is an Atomic Force Microscopy (AFM) topographical image showing a plasma-treated lens before further processing by hydration and autoclaving. The image shows a lens coating with a smooth surface (100% surface coverage) very similar in appearance to the surface before plasma treatment. This is because most plasma coatings are conformal to the original surface. As evident, the surface is not perfectly smooth. The surfaces show some fine multi-directional scratches due to tooling marks.

Figure 3:
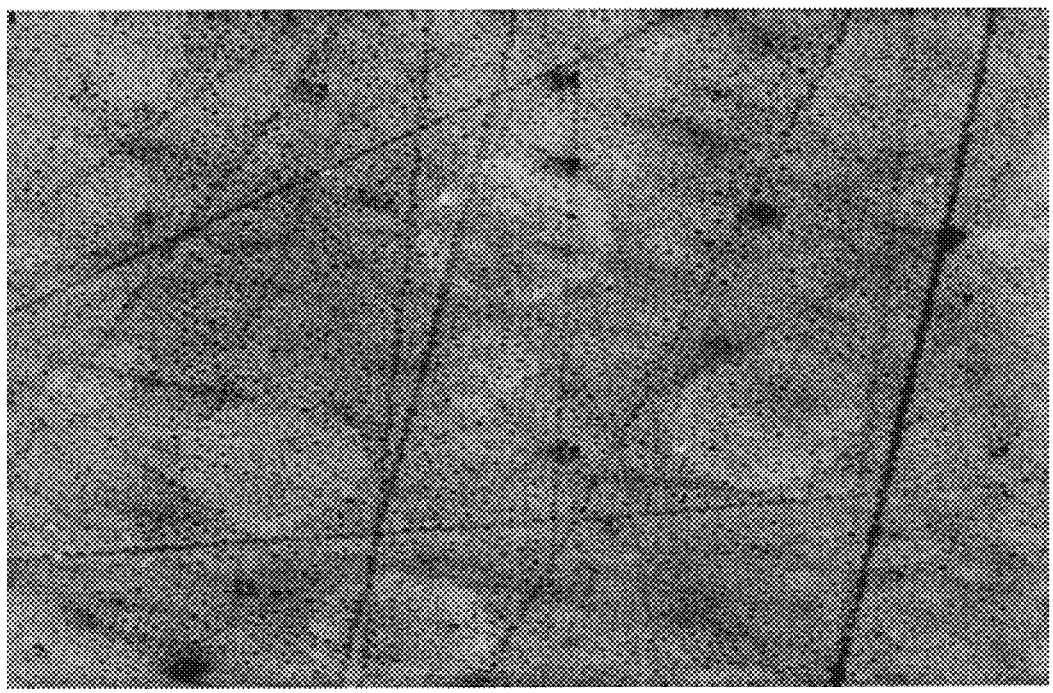
FIG. 3 is an Atomic Force Microscopy (AFM) topographical image (50×50 square microns) showing, for comparison, a hydrated and autoclaved plasma-treated lens (fully processed) after a time period of only 4 minutes, otherwise processed comparably to the lens in FIG. 3, showing a relatively smooth surface with barely visable plates and about 20 percent surface coverage.

FIG. 3, for comparison to a lens surface according to the present invention, is an Atomic Force Microscopy (AFM) photograph showing an autoclaved plasma-treated lens (fully processed) after a plasma treatment time period of only 4 minutes per side but otherwise comparable to the process conditions of this Example. The coating thickness is only 4+/−2 nm thick, with only about 20% coverage. The coloring in the image represent distinct heights on the surface. The lighter areas correspond to the raised features, while the dark areas correspond to the recessed features. In the image of FIG. 3, it is apparent that the coating has cracked and flaked away, exposing the surface of the lens, therefore showing a relatively smooth surface with barely visable plates.

Figure 4:
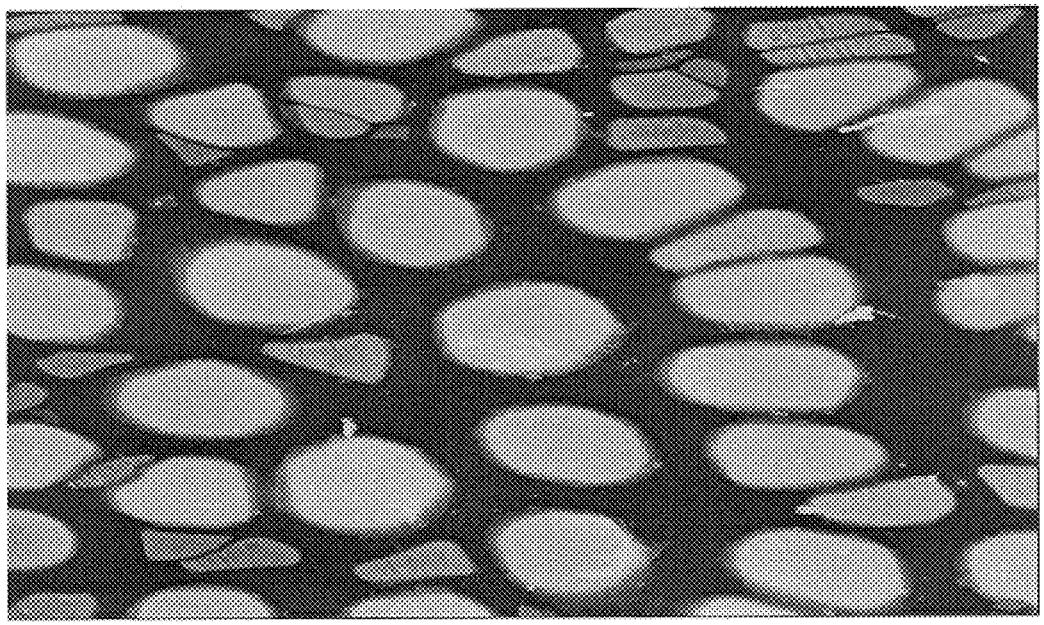
FIG. 4 is an Atomic Force Microscopy (AFM) topographical image (50×50 microns) showing a plasma-treated lens according to the present invention that has been extracted with isopropanol and prior to autoclaving, showing about 50 percent surface coverage.

FIG. 4 is an Atomic Force Microscopy (AFM) image of an plasma-treated lens following extraction with isopropanol. The lens thickness is about 100 nm (which will be reduced during subsequent autoclaving), and the surface coverage is about 50 percent. Since the AFM images are in the dry state, the surface coverage of the extracted and fully processed lenses are comparable.

Figure 5:
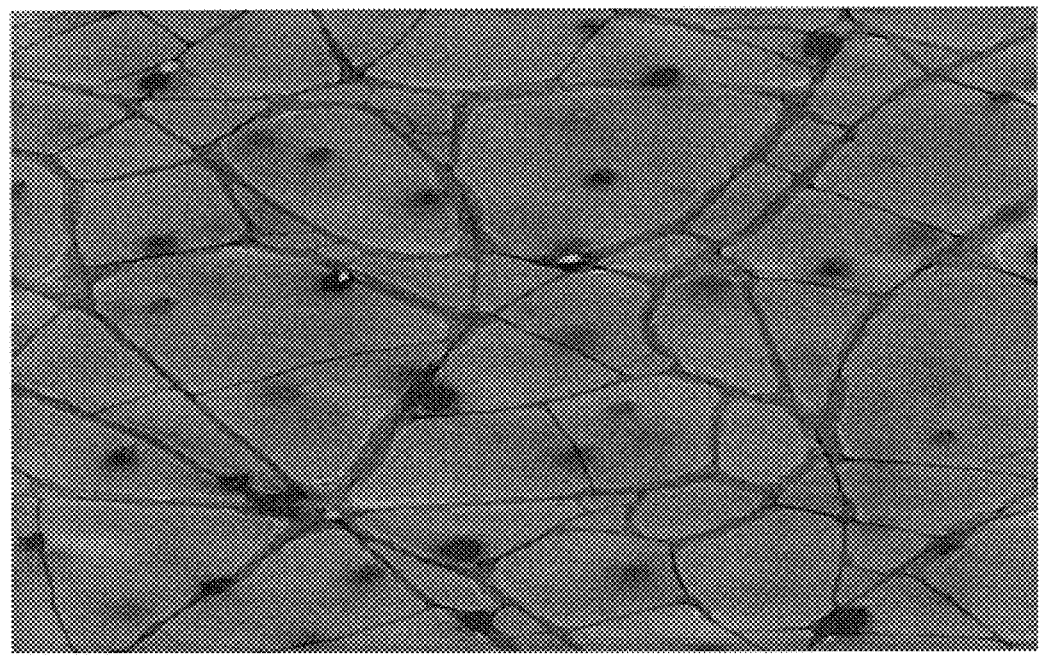
FIG. 5 is an Atomic Force Microscopy (AFM) topographical image (50×50 microns) showing a hydrated and autoclaved plasma-treated lens (fully processed) according to the present invention, after a time period of 8 minutes per side according to the conditions of Example 1, showing about 95% surface coverage. All AFM images are on dried samples.

FIG. 5 is an Atomic Force Microscopy (AFM) topographical image (50×50 square microns) showing a hydrated and autoclaved plasma-treated lens (fully processed according to the present invention) after a time period of 8 minutes, showing distinct plates with excellent surface coverage. The coating thickness is about 10+/−2 nm thick (100 angstroms) with about 95 percent surface coverage.

The average depth of the fissures in the coating (also referred to as the "coating thickness") were directly measured using AFM software. The thickness of 3–5 islands (arbitrarily selected) in each picture is measured and averaged to yield an overall coating thickness for each image. Preferably, the RMS roughness of the fully processed lens is less than about 50 nm, more preferably about 2 to about 25 nm, most preferably 5 to 20 nm.

This comparison shows that, in addition to such other parameters as pressure or air flow rate, the time period of the plasma treatment is a significant controlling parameter during plasma treatment in order to obtain the desired coating.

COMPARATIVE EXAMPLE 3

Silicon hydrogel lenses of the formulation in Example 1 above were plasma treated for a period of time of 4 minutes per side and used in a clinical study. Due to variance in the lens surface topography some of the lots showed a smooth surface without any evidence of plates when inspected employing surface imaging by Atomic Force Microscopy (AFM), in which a 50×50 micron square image was made of a typical area of the lens equal to $1.5 \times 10^8$ square microns. Thirteen lots were examined showing a full range of surfaces and were classified as "Mosaic to Transitional" (hereafter "Mosaic") and "Transitional to Smooth" (hereafter "Smooth"). Approximately 42 percent of the lenses exhibited a Smooth Surface. By the term "Smooth," with respect to the lens, is meant a lens surface that does not show the silicate plates surrounded by valleys or fissures, similar to closely spaced islands surrounded by rivers. The Smooth Lenses also included lenses with a surface coverage of less than 30 percent and a valley depth of less than about 50 angstroms. The Mosaic lens were those which showed more than 30 percent coverage and a valley depth greater than 50 angstroms.

In order to correlate surface characteristics to clinical performance, the lenses used in the clinical study were sorted by degree of deposition based on information provided by practitioners involved in the study. The Grade Levels were from 0 to 4 corresponding to increasing levels of deposition via slit lamp analysis. For Grades 0 and 1, where the number of patients was high, the lenses were separated so that half of the Grade could be tested for lipid and the rest for protein. Since the number of lenses in Grades 2, 3 and 4 were much lower, these lenses were cut in half (using a scalpel and gloves) so that each lens could be tested for protein and lipid. Data generated on these lenses was doubled in order to represent deposition on the entire lens. The lenses were worn for 3 months with enzyme cleaning at the end of a week of wear and then disinfected with ReNu MPS solution overnight. In some cases, the lens was replaced before the 3 months due to specified reasons. In all other instances, the lens was worn for the entire study. After 3 months, all lenses were shipped (in a dry state) and stored in a refrigerator upon arrival.

To further correlate surface characteristics to deposition properties (composition), protein and lipid analysis of the deposits were conducted. Protein Analysis was done using the colorimetric BCA analytical method (Sigma). The method employs the protein induced reduction of Cu(II) to Cu(I). A purple complex ($A_{MAX}$=562 run) is then formed following the addition of Bicinchoninic acid (BCA) to the reduced copper. The intensity of the complex is shown to be directly proportional over the protein concentration range 5 $\mu$g/ml to 2000 $\mu$/ml. Following incubation at 37°, the rate of color development is slowed sufficiently to allow large numbers of samples to be done in a single run. The standard protein solution utilized was BSA with a standard concentration range of 0–200 $\mu$g. The analytical protocol was as follows:

1) In the preparation of the standards, an unworn lens is taken out of vial, left to air dry and then placed in a plastic centrifuge tube along with standard BSA solution. Worn lenses (also air dried) are also placed in centrifuge tubes. A mixture of BCA/Copper (II) Sulfate solution is then added to the dried lenses.

2) Tubes are then placed in a water bath at 37° for 15 minutes. After incubation, the purple complex develops.

4) Samples and standards are read at 562 nm.

5) Protein concentration is then determined from a Standard plot of Absorbence vs. Concentration ($\mu$g).

6) Protein results reported represent total amount of bound protein.

Gas Chromatography (GC) is the method by which total lipid concentration was determined. Tripalmitin ($C_{16}$) was used as the standard based on previous GC runs of $C_{12}$–$C_{22}$ chain length lipids which all showed similar retention times.

Stock solution of standards was 1 mg/ml Tripalmitin in Methylene Chloride where the concentration range for the standards was 0–100 μg. The analytical protocol involved the followed steps:

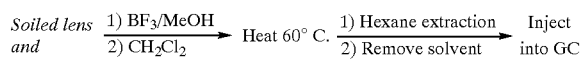

The same protocol as above was used for the standards wherein an unworn lens is placed in a glass test tube with the standard solution. Otherwise, the protocol was as follows:

1) When the hexane is added to the lens (with heat), the lens will dissolve and eventually precipitate to the bottom of the tube. Two phases will form. The bottom layer is cloudy (MeOH layer) and the top layer (hexane layer) is clear. The hexane layer is extracted out. The extraction of samples and standards is done twice. The fact that the lens dissolves during this procedure allows one to determine the total amount of lipid both on the surface and potentially imbedded into the lens matrix.

2) A stream of $N_2$ is used to blow off the hexane from the tubes. The samples and standards are then re-suspended in 50 μl of hexane.

3) Hexane is run through the GC (2 μl) to make sure peaks come off with the appropriate retention times.

4) A 2 μl amount from each tube is then injected into the GC. The syringe was cleaned 10–14 times with hexane between each run. The retention time of the lipids corresponds to chain length. $C_8$–$C_{12}$, $C_{12}$, $C_{14}$ and $C_{16}$–$C_{18}$ come off at increasing intervals. The GC is a Capillary CG 30 ft HPR1 column attached to an FID detector (mass), so mass can be read corresponding to the peaks (in μg).

5) The standard curve of tripalmitin plots the Peak Area vs. The Amount Lipid (μg).

Based on the practitioner grading scale, 86% of the patients involved in the study were categorized in Grades 0–2, reflecting minimal to no surface deposits. The average Protein concentration among these Grades was 34.2 μg and the average amount of Lipid was 17.5 μg. The detailed results of protein and lipid analysis in the study are shown in Table 3 below:

TABLE 3

|  | Grade 0 84* | Grade 1 46* | Grade 2 28* | Grade 3 19* | Grade 4 |
|---|---|---|---|---|---|
| Average Protein Concentration: | 24.7 μg | 42.7 μg | 35.3 μg | 39.7 μg | 43.4 μg |
| Range: | 0–105 μg | 8.6–80 μg | 2.6–75 μg | 0–92 μg | 25–60 μg |
| Average Lipid Concentration: | 0 μg | 16.0 μg | 19.1 μg | 40.1 μg | 65.0 μg |
| Range: | — | 0–51 μg | 0–61.4 μg | 0–92 μg | 30–96 μg |

*Numbers in bold represent the total number of patients with that Grade of deposition.

The range of protein and lipid concentrations observed demonstrates the individual variability in deposition levels as well as the variability in the practitioners' assessment of Grade of deposition. Overall, protein levels among all of the Grades remains relatively constant (~35–40 μg) except for Grade 0 where the number is a bit lower (25 μg). Lipid deposition, however, consistently increases with Grade indicating that heavy soilers seem to be depositing on average more lipid than protein. Of the 24 patients who were categorized as having Grade 3 and 4 deposition, 5 had experienced discomfort. There was no correlation observed between the age (wear time) of the lens and the degree of deposition.

The following table shows the distribution of the lots among the Grades of deposition demonstrating the relative susceptibility of lenses in particular lots to deposition.

TABLE 4

| Lens Lot # | # Lenses Grade 0 | # Lenses Grade 1 | # Lenses Grade 2 | # Lenses Grade 3 | # Lenses Grade 4 |
|---|---|---|---|---|---|
| 1 | 8 | 6 | 4 | 3 | 1 |
| 2 | 7 | 5 | 1 | 4 | 1 |
| 3 | 8 | 4 | 0 | 3 |  |
| 4 | 8 | 2 | 1 | 1 |  |
| 5 | 12 | 5 | 0 | 3 |  |
| 6 | 12 | 3 | 1 | 0 |  |
| 7 | 10 | 1 | 1 | 3 | 2 |
| 8 | 6 | 2 | 2 | 1 |  |
| 9 | 5 | 2 | 2 | 5 |  |
| 10 | 2 | 2 | 1 | 2 | 1 |
| 11 | 4 | 6 | 5 | 3 |  |
| 12 | 6 | 5 | 1 | 0 |  |
| 13 | 6 | 3 | 2 | 1 |  |

Correlating the lens surface to the deposition, the results were as follows:

TABLE 5

| MOSMC | | | SMOOTH | | |
|---|---|---|---|---|---|
| Lot | Surface | % 2–4 | Lot | Surface | % 2–4 |
| 3 | 2 | 9% | 2 | 3 | 11% |
| 4 | 1.75 | 5% | 5 | 2.75 | 15% |
| 6 | 2.25 | 6% | 7 | 2.5 | 17% |
| 8 | 1 | 7% | 8 | 3 | 16% |
| 10 | 2 | 14% | 9 | 2.75 | 13% |
| 12 | 2 | 7% | 11 | 3 | 11% |
|  |  |  | 13 | 2.75 | 13% |

*These lots were those that were noted in the field as lots with less wetting and/or heavy deposits.

These results show that for plasma treated lenses showing "mosaic" surface characteristics similar to that of FIG. 3 from Example 2 above, the percentage of lenses with a deposit rating of greater than 2 was 8%, whereas for similarly plasma treated lenses that did not show the "mosaic" surface characteristics of FIG. 2 (for example, like the lens shown in FIG. 4), the percentage of lenses with a deposit rating of greater than 2 was 14%, showing a statistically significant superiority for the mosaic pattern.

EXAMPLE 4

To show the change in wetting properties of lenses according to the present invention, contact angle measurements were made of an untreated lens (before plasma treatment), a plasma treated lens (immediately after plasma treatment) and after fully processing (including hydration and heat sterilization). The contact angle was measured as follows. A platinum wire (Pt) was employed to minimize contamination. The Pt wire was pulled across a flame over a Bunsen burner until the wire reached a dull red (orange) glow, in order to ensure that the water (HPLC grade) employed in the test was exposed to a fresh, clean metal surface, free from contamination. About 2 microliters of water was transferred from its bottle to the wire, which process involved tipping of the bottle so that the maximum amount of wire was under the liquid. The water on the wire was transferred, without dragging along the surface, to a lens made from the material of Example 1. Once transferred, an NRL-100 Rhamén-Hart Contact Angle Goniometer was employed to measure the contact angle. The baseline was set by adjusting the stage height until the baseline was drawn between the bottom of the drop and its own reflection. After finding the baseline, the contact angle formed by the drop was measured on the right and on the left. Another drop of water was added to the first drop, and then the contact angles were recalculated for the left and right sides. All four measurements were averaged. Employing this measurement, the lens surface before treatment exhibited a water contact angle of about 90 dynes/cm. Following plasma treatment, the water contact angle was 0 dynes/cm. Following heat sterilization, the fully processed lens exhibited a contact angle of 72.4+/−2 dynes/cm. All measurements were on dry lenses.

Many other modifications and variations of the present invention are possible in light of the teachings herein. It is therefore understood that, within the scope of the claims, the present invention can be practiced other than as herein specifically described.

What is claimed is:

1. A silicone hydrogel contact lens including a hydrophilic surface having a silicate-containing surface coating characterized by a mosaic pattern of projecting plates surrounded by receding fissures when viewing a 50×50 micron square AFM image, wherein, as a result of a controlled manufacturing process, the average fissure depth is on average between about 100 and 500 angstroms and the plate coverage is on average between about 40 and 99 percent.

2. The contact lens of claim 1, wherein the fissure depth is on average between 150 and 200 angstroms.

3. The contact lens of claim 1, wherein the plate coverage is on average between about 60 and 99 percent.

4. The contact lens of claim 1, wherein the silicone hydrogel comprises 30 to 60 percent by weight of one or more silicone macromonomers, 1 to 35 percent by weight of one or more polysiloxanylalkyl (meth)acrylic monomers, and 20 to 40 percent by weight of a hydrophilic monomer.

5. The contact lens of claim 1, wherein the silane macromonomer is a poly(organosiloxane) capped with an unsaturated group at two or more ends.

6. The contact lens of claim 1 wherein the silane macromonomer is a silicon-containing vinyl carbonate or vinyl carbamate or a polyurethane-polysiloxane having one or more hard-soft-hard blocks and end-capped with a hydrophilic monomer.

7. The contact lens of claim 1, wherein the polysiloxanylalkyl (meth)acrylic monomers is methacryloxypropyl tris(trimethyl-siloxy)silane.

8. The contact lens of claim 1, wherein the hydrophilic monomer is selected from the group consisting of unsaturated carboxylic acids, acrylic substituted alcohols, vinyl lactams, acrylamides, vinyl carbonate or vinyl carbamate, oxazolone monomers, and mixtures thereof.

9. The contact lens of claim 1, wherein the hydrophilic monomer is selected from the group consisting of methacrylic and acrylic acids, 2-hydroxyethylmethacrylate and 2-hydroxyethylacrylate, N-vinyl pyrrolidone, methacrylamide, N,N-dimethylacrylamide, and mixtures thereof.

* * * * *

Disclaimer 6,193,369 — Paul L. Valint, Jr.; George L. Grobe, both of Pittsford; Daniel M. Ammon, Jr., Rochester; Michael J. Moorehead, Fairport, all of NY (US). PLASMA SURFACE TREATMENT OF SILICONE HYDROGEL CONTACT LENSES, Patent dated Feb. 27, 2001. Disclaimer filed Nov. 25, 2002, by the assignee, Bausch & Lomb, Incorporated.

Hereby enters this disclaimer to claims 1- 9, of said patent.

*(Official Gazette, May 13, 2003)*